(12) United States Patent
Hirotsu et al.

(10) Patent No.: US 9,175,632 B2
(45) Date of Patent: Nov. 3, 2015

(54) ENGINE START CONTROL APPARATUS FOR HYBRID VEHICLE (71) Applicant: JATCO LTD, Fuji-shi, Shizuoka (JP)

(72) Inventors: Shingo Hirotsu, Atsugi (JP); Hiroshi Yamashita, Isehara (JP)

(73) Assignee: JATCO LTD, Fuji-Shi (JP)

( * ) Notice: Subject to any disclaimer, the term of this patent is extended or adjusted under 35 U.S.C. 154(b) by 392 days.

(21) Appl. No.: 13/735,390

(22) Filed: Jan. 7, 2013

(65) Prior Publication Data
US 2013/0191012 A1 Jul. 25, 2013

(30) Foreign Application Priority Data

Jan. 24, 2012 (JP) ................................. 2012-011650

(51) Int. Cl.
*F02D 45/00* (2006.01)
*B60W 10/02* (2006.01)
*B60W 10/06* (2006.01)
*B60W 10/08* (2006.01)
*B60W 10/30* (2006.01)
*B60W 20/00* (2006.01)

(52) U.S. Cl.
CPC ............... *F02D 45/00* (2013.01); *B60W 10/02* (2013.01); *B60W 10/06* (2013.01); *B60W 10/08* (2013.01); *B60W 10/30* (2013.01); *B60W 20/40* (2013.01); *B60W 2510/244* (2013.01); *B60W 2530/18* (2013.01); *B60W 2540/06* (2013.01); *B60W 2550/12* (2013.01); *B60W 2710/025* (2013.01); *Y02T 10/6286* (2013.01)

(58) Field of Classification Search
CPC ...... F02D 45/00; F02N 11/003; B60W 20/40; B60W 10/30; B60W 10/02; B60W 10/06; B60W 10/08
USPC ....... 123/196 S, 198 C, 179.3, 179.4, 179.25, 123/179.28, 179.19; 701/113
See application file for complete search history.

(56) References Cited

U.S. PATENT DOCUMENTS 4,406,951 A * 9/1983 Inoue ........................... 307/10.1
5,168,975 A * 12/1992 Bernhardt et al. .............. 477/39
(Continued)

FOREIGN PATENT DOCUMENTS

JP 2003-032808 A 1/2003
JP 2010-126072 A 6/2010
(Continued)

*Primary Examiner* — Hai Huynh
(74) *Attorney, Agent, or Firm* — Foley & Lardner LLP (57) ABSTRACT An engine start control apparatus for a hybrid vehicle includes: an engine start control section configured to crank the engine by using the motor as a starter motor while the hydraulic clutch is slip-engaged when the discharge pressure from the oil pump is ensured by driving the motor, when the engine is started after an ignition switch is switched to an ON state, the engine start control section being configured to drive the oil pump by the motor at a no load during a predetermined time period after the engine is stopped when the ignition switch is in an OFF state.

6 Claims, 6 Drawing Sheets

(56) References Cited

U.S. PATENT DOCUMENTS

| | | |
|---|---|---|
| 6,852,053 B2 | 2/2005 | Nakano et al. |
| 7,730,982 B2 * | 6/2010 | Hidaka et al. ............ 180/65.265 |
| 8,055,401 B2 * | 11/2011 | Aldrich et al. ............... 701/33.9 |
| 8,433,484 B2 | 4/2013 | Waku et al. |
| 8,606,446 B2 * | 12/2013 | Ito et al. .......................... 701/22 |
| 8,935,077 B2 * | 1/2015 | Garrard ......................... 701/103 |
| 8,951,025 B2 * | 2/2015 | Schultz ......................... 417/319 |
| 2003/0069104 A1 | 4/2003 | Nakano et al. |
| 2011/0224879 A1 | 9/2011 | Waku et al. |
| 2012/0080003 A1 * | 4/2012 | Schultz .................... 123/179.31 |
| 2014/0331739 A1 * | 11/2014 | Moon ............................. 73/1.59 |

FOREIGN PATENT DOCUMENTS

| | | |
|---|---|---|
| JP | 2011-007194 A | 1/2011 |
| KR | 10-2011-0102207 A | 9/2011 |

* cited by examiner

FIG.8

ENGINE START CONTROL APPARATUS FOR HYBRID VEHICLE

BACKGROUND OF THE INVENTION

This invention relates to an engine start control apparatus for a hybrid vehicle which cranks an engine by using a motor which is for running, and which is provided in a drivetrain, as a starter motor, by engaging a normally-open hydraulic clutch provided between an engine and the motor.

U.S. Patent Application Publication No. 2003/0069104 A1 (corresponding to Japanese Patent Application Publication No. 2003-32808) discloses a conventional hybrid driving apparatus including a drivetrain including an engine, a motor, a normally-open hydraulic clutch disposed between the engine and the motor.

In this hybrid driving apparatus, when the engine is started in accordance with an engine start request after an ignition switch is switched to an ON state, operations are performed as follows.

(1) A motor is driven. A clutch hydraulic pressure generated based on a discharge pressure from an oil pump driven by the motor is ensured.

(2) The engine is cranked by using the motor as a starter motor while a hydraulic clutch is slip-engaged.

(3) The hydraulic clutch is fully engaged after the engine start is finished.

In the above-described process (1), the oil pump (for example, vane pump) has a generally well-known structure which sucks the hydraulic fluid stored in an oil pan through a strainer, and thereby generates the pump discharge pressure. When the pump discharge pressure is increased to a target hydraulic pressure, the clutch hydraulic pressure is ensured.

SUMMARY OF THE INVENTION

However, in the conventional hybrid driving apparatus, in a case where an air content percentage of an air bubbles (=air particles) included in the hydraulic fluid stored in the oil pan is high when the engine is started by switching the ignition switch to the ON state, the start of the increase (initial rise) of the discharge pressure from the oil pump is delayed in a low temperature state, so that the engine start is delayed.

That is, the start of the increase of the discharge pressure from the oil pump is delayed due to the stirring of the rotary members of components (drums, gears, pulleys, belts, and so on) of a power train. When the air content percentage of the air bubbles included in the hydraulic fluid becomes high by the stirring of the hydraulic fluid, the air bubbles are remained (accumulated) on the oil filter of the strainer in an air layer state in which the air bubbles are gathered together (dense). Accordingly, when the engine is started immediately after the ignition switch is switched to the ON state, the discharge pressure does not become the target hydraulic pressure while the oil pump driven by the motor sucks the air bubbles.

Antifoaming agent (defoaming agent) to defoam (remove) the air bubbles is mixed in the hydraulic fluid. However, the defoaming effect is deteriorated in accordance with the deterioration of the oil which is caused in accordance with the running distance. In particular, when the oil temperature is low, the friction becomes high, the battery voltage becomes low, and the air bubbles are hard to be defoamed. Accordingly, the time of the start of the increase (the initial rise) of the hydraulic pressure of the oil pump is delayed due to the above-described plurality of the causes, so that the long time period is needed for the start of the increase of the hydraulic pressure.

It is, therefore, an object of the present invention to provide an engine start control apparatus for a hybrid vehicle which is devised to solve the above-described problems, and to ensure a response of an engine start even by a small battery at the engine start in a low temperature state.

According to one aspect of the present invention, An engine start control apparatus for a hybrid vehicle including a drivetrain including an engine, a motor, a normally-open hydraulic clutch disposed between the engine and the motor, and arranged to be engaged by a clutch hydraulic pressure generated based on a discharge pressure from an oil pump driven by the motor, the engine start control apparatus comprises: an engine start control section configured to crank the engine by using the motor as a starter motor while the hydraulic clutch is slip-engaged when the discharge pressure from the oil pump is ensured by driving the motor, when the engine is started after an ignition switch is switched to an ON state, the engine start control section being configured to drive the oil pump by the motor at a no load during a predetermined time period after the engine is stopped when the ignition switch is in an OFF state.

DETAILED DESCRIPTION OF THE INVENTION

Hereinafter, an engine start control apparatus for a hybrid vehicle according to a first embodiment of the present invention will be illustrated with reference to the drawings.

First, a configuration is illustrated.

A configuration of the engine start control apparatus for the hybrid vehicle according to the first embodiment is illustrated hereinafter with "overall system configuration", "calculation operation configuration of integrated controller", and "engine start control configuration".

[Overall System Configuration]

Figure 1:
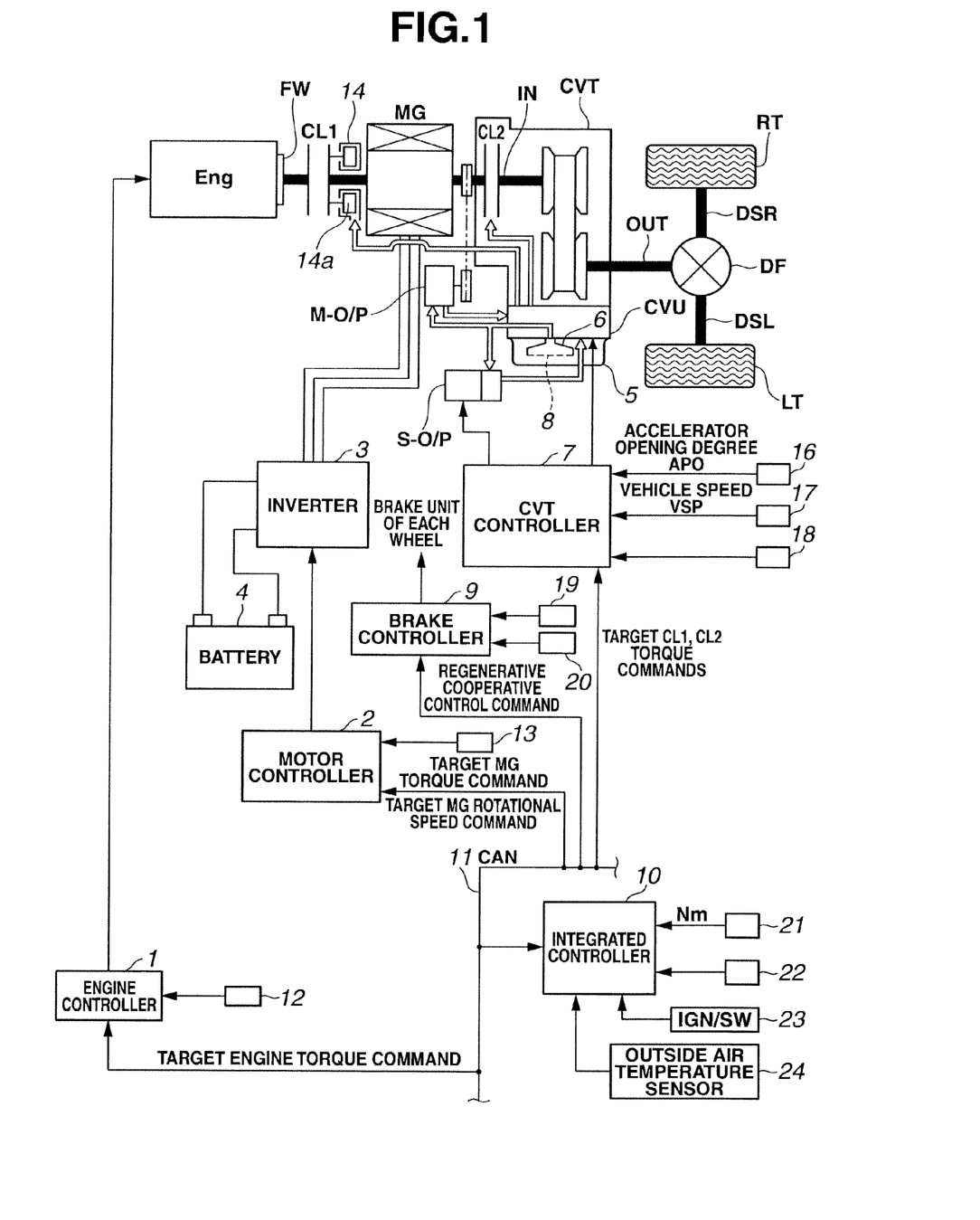
FIG. 1 is an overall system diagram showing a front-engine front-drive (FF) hybrid vehicle to which an engine start control apparatus according to a first embodiment of the present invention is applied.

FIG. 1 is an overall system diagram showing a front-engine front-drive (FF) hybrid vehicle to which an engine start control apparatus according to the first embodiment of the present invention is applied. Hereinafter, the overall system configuration is illustrated with reference to FIG. 1.

As shown in FIG. 1, a drivetrain (driveline) of the FF hybrid vehicle in the first embodiment includes an engine Eng, a flywheel FW, a first clutch CL1 (hydraulic clutch), a motor generator MG (motor), a mechanical oil pump M-O/P (oil pump), a sub electric oil pump S-O/P, a second clutch CL2, a belt type continuously variable transmission CVT, a left front tire LT, and a right front tire RT.

Engine Eng is a gasoline engine or a diesel engine. A start control, a stop control, a control of a valve opening degree of a throttle valve, a fuel cut control, and so on of engine Eng are performed based on an engine control command from an engine controller 1. An engine output shaft of engine Eng is provided with flywheel FW.

First clutch CL1 is a normally-open hydraulic clutch disposed between engine Eng and motor generator MG. A full engagement, a slip engagement, and a disengagement of first clutch CL1 are controlled by supplying a control hydraulic pressure generated by a hydraulic pressure control valve unit CVU based on a control command from a CVT controller 7, to a piston 14a of a hydraulic actuator 14. For example, first clutch CL1 is a dry-type multiple-plate clutch.

Motor generator MG is a synchronous motor generator including a rotor in which permanent magnets are embedded, and a stator around which a stator coil are wound. Motor generator MG is controlled by being applied with a three-phase alternating current generated by an inverter 3 based on a control command from a motor controller 2. This motor generator MG acts as a motor which is driven and rotated by supply of an electric power from a battery 4 (power running), and acts as a generator which generates the electromotive force at both ends of the stator coil when the rotor receives a rotation energy from engine Eng and driving wheels, and charges battery 4 (regeneration).

In mechanical oil pump M-O/P, a pair of sprockets are provided on a pump shaft and a motor shaft of motor generator MG, and a chain is wound around the pair of the sprockets. Mechanical oil pump M-O/P is a vane pump arranged to be driven by motor generator MG through the chain. This mechanical oil pump M-O/P is arranged to suck a hydraulic fluid stored in an oil pan 5 disposed at a position below hydraulic pressure control valve unit CVU provided on belt type continuously variable transmission CVT, through a strainer 6 having an oil filter 8. Hydraulic pressure control valve unit CVU uses the discharge pressure from mechanical pump M-O/P as a hydraulic pressure source. Sub electric oil pump S-O/P is set mainly for lubricating and cooling second clutch CL2. Sub electric oil pump S-O/P is controlled and driven based on a command from CVT controller 7.

This second clutch CL2 is disposed between motor generator MG and a transmission input shaft IN. A forward clutch arranged to be engaged in a forward-reverse switching mechanism in belt type continuously variable transmission CVT when a forward range is selected is used as second clutch CL2. An engagement, a slip engagement, and a disengagement of this second clutch CL2 are controlled by a control hydraulic pressure generated by hydraulic pressure control valve unit CVU based on a control command from CVT controller 7. This second clutch CL2 is, for example, a normally-open wet-type multiple-plate clutch.

Belt type continuously variable transmission CVT is disposed on a downstream side of motor generator MG. In belt type continuously variable transmission CVT, a target input rotational speed is determined in accordance with the vehicle speed, an accelerator opening degree, and so on. This belt type continuously variable transmission CVT automatically continuously varies a transmission gear ratio. This belt type continuously variable transmission mainly includes a primary pulley on the transmission input shaft IN's side, a secondary pulley on a transmission output shaft OUT's side, and a belt wound around the primary pulley and the secondary pulley. In this belt type continuously variable transmission CVT, the discharge pressure from mechanical oil pump M-O/P is used as a source pressure, and a primary pulley pressure and a secondary pulley pressure are generated. Belt type continuously variable transmission CVT moves a movable pulley of the primary pulley and a movable pulley of the secondary pulley in an axial direction by these pulley pressures, and thereby varies contact radii of the belt with respect to the pulleys so as to continuously vary the transmission gear ratio.

Transmission output shaft OUT of belt type continuously variable transmission CVT is connected through a final reduction gear mechanism (not shown) to a differential gear DF. From differential gear DF through a left drive shaft DSL and a right drive shaft DSR, there are provided, respectively, left and right front tires LT and RT.

This FF hybrid vehicle has a plurality of (three) driving modes according to driving manners. The driving modes of the FF hybrid vehicle are an electric vehicle mode (hereinafter, referred to as an EV mode), a hybrid vehicle mode (hereinafter, referred to as an HEV mode), and a driving torque control mode (hereinafter, referred to as a WSC mode (Wet Start Clutch mode)).

The EV mode is a mode in which first clutch CL1 is disengaged and the vehicle runs by using motor generator MG as the driving source. The EV mode includes a motor running mode and a regenerative running mode. In the EV mode, the vehicle runs by one of the motor running mode and the regenerative running mode. This EV mode is selected when a required driving force is low and a battery SOC is ensured.

The HEV mode is a mode in which first clutch CL1 is engaged and the vehicle runs by using engine Eng and motor generator MG as the driving source. The HEV mode includes a motor assist running mode, a power generation mode, and an engine running mode. In the HEV mode, the vehicle runs by one of the motor assist running mode, the power generation mode, and the engine running mode. This HEV mode is selected when the required driving force is high, or when battery SOC is deficient.

The WSC mode is a mode in which second clutch CL2 is held to a slip engagement state by a rotational speed control of motor generator MG and the clutch hydraulic pressure control, and the vehicle runs while a clutch torque capacity is controlled so that a clutch transmitting torque passing through second clutch CL2 becomes the required driving torque determined in accordance with the vehicle state and the driver's operation. For example, this WSC mode is selected in a start region in which the engine speed becomes smaller than the idle speed, like the stop state, the start state of the vehicle, and so on when the HEV mode is selected.

Next, a control system of the FF hybrid vehicle is illustrated. As shown in FIG. 1, the control system of the FF hybrid vehicle in the first embodiment includes engine controller 1, motor controller 2, inverter 3, battery 4, CVT controller 7, a brake controller 9, and an integrated controller 10. Besides, the controllers 1, 2, 7, and 9 and integrated controller 10 are connected with each other through CAN communication lines 11 which are capable of exchanging the information.

Engine controller 1 receives an engine speed information from an engine speed sensor 12, a target engine torque command from integrated controller 10, and other necessary information. Engine controller 10 outputs a command to control an engine operating point (Ne, Te) to a throttle valve actuator of engine Eng, and so on.

Motor controller 2 receives information from a resolver 13 arranged to sense a rotation position of the rotor of motor generator MG, a target MG torque command and a target MG rotational speed command from integrated controller 10, and other necessary information. Motor controller 2 outputs a command to control a motor operating point (Nm, Tm) of motor generator MG, to inverter 3. Besides, this motor controller 2 basically performs a torque control so that the motor torque becomes equal to the target torque. However, during the slip control and so on of second clutch CL2, motor controller 2 performs a rotational speed control so that the motor rotational becomes equal to the target rotational speed. Moreover, this motor controller 2 monitors battery SOC indicative of the charge capacity of battery 4. Motor controller 2 outputs this battery SOC information through CAN communication lines 11 to integrated controller 10.

CVT controller 7 receives information from an accelerator opening degree sensor 16, a vehicle speed sensor 17, other sensors 18, and so on. CVT controller 7 searches the target input rotational speed determined accelerator opening degree APO and vehicle speed VSP from a shift map when the vehicle runs while the D range is selected. CVT controller 7 outputs a control command to obtain the searched target input rotational speed (transmission gear ratio), to hydraulic pressure control valve unit CVU. In addition to this shift control, CVT controller 7 performs a clutch control to output a command to control the clutch pressures to first clutch CL1 and second clutch CL2 to hydraulic pressure control valve unit CVU when CVT controller 7 receives target CL1 torque command and target CL2 torque command from integrated controller 10.

Brake controller 9 receives sensor information from wheel sensors 19 arranged to sense wheel speeds of four wheels, a brake stroke sensor 20, a regenerative coordinate (cooperative) control command from integrated controller 10, and other necessary information. For example, when the only regenerative braking force is not enough for the required braking force determined from the brake stroke at the brake depression, brake controller 9 performs a regenerative coordinate brake control to compensate for the insufficient amount by a mechanical braking force (hydraulic pressure braking force and motor braking force).

Integrated controller 10 monitors a consumption energy of an entire vehicle. Integrated controller 10 serves to run the vehicle at a maximum efficiency. Integrated controller 10 receives necessary information from a motor rotational speed sensor 21 arranged to sense motor rotational speed Nm, other sensors/other switches 22, an ignition switch 23, and an outside air temperature sensor 24, and information through CAN communication lines 11. Integrated controller 10 outputs the target engine torque command to engine controller 1, outputs the target MG torque command and the target MG rotational speed command to motor controller 2, outputs the target CL1 torque command and the target CL2 torque command to CVT controller 7, and outputs the regenerative coordinate control command to brake controller 9.

[Calculation Operation Configuration of Integrated Controller]

Figure 2:
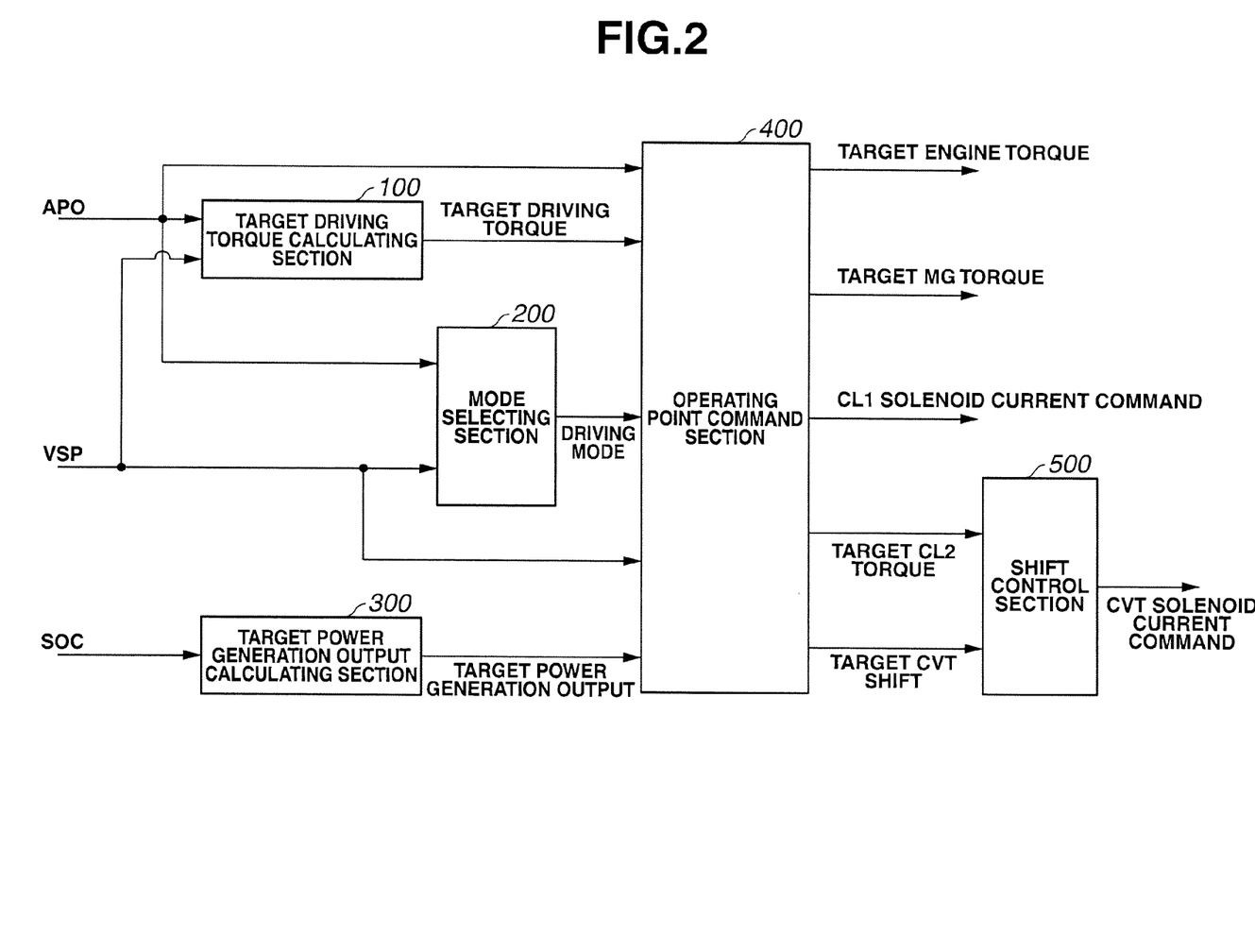
FIG. 2 is a control block diagram showing an calculation operation performed in an integrated controller 10 in the first embodiment.
Figure 3:
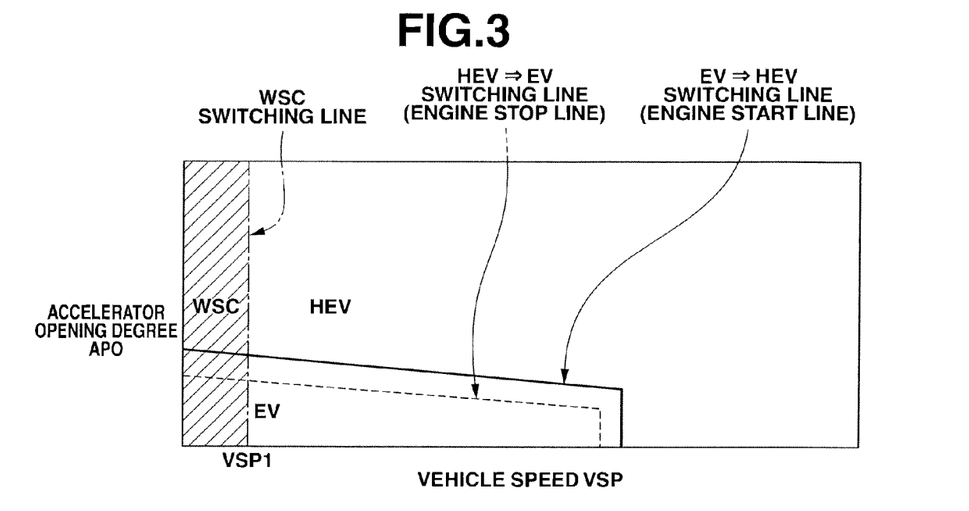
FIG. 3 is a view showing one example of an EV-HEV selection map set in a mode selecting section 200 of integrated controller 10 in the first embodiment.

FIG. 2 is a control block diagram showing a calculation operation performed in integrated controller 10 in the first embodiment. FIG. 3 is a view showing one example of map set in a mode selecting section 200 of integrated controller 10. Hereinafter, the calculation operation configuration in integrated controller 10 is illustrated with reference to FIGS. 2 and 3.

As shown in FIG. 2, integrated controller 10 includes a target driving torque calculating section 100, mode selecting section 200, a target power generation output calculating section 300, an operating point command section 400, and a shift control section 500.

Target driving torque calculating section 100 calculates a target steady state driving torque and an MG assist torque from accelerator opening degree APO and vehicle speed VSP by using a target steady state driving torque map and an MG assist torque map.

Mode selecting section 200 calculates a target driving mode (the HEV mode, the EV mode, and the WSC mode) by using an EV-HEV selection map shown in FIG. 3 from accelerator opening degree APO and vehicle speed VSP. In this EV-HEV selection map, there are set an EV→HEV switching line (engine start line) to switch to the HEV mode when the operating (driving) point (APO, VSP) in the EV region moves across, an HEV→EV switching line (engine stop line) to switch to the EV mode when the operating (driving) point (APO, VSP) in the HEV region moves across, and a WSC switching line to switch to the WSC mode when the operating (driving) point (APO, VSP) enters the WSC region when the HEV (EV) mode is selected. The HEV→EV switching line and the EV→HEV switching line are set to have a hysteresis amount as a line dividing the EV region and the HEV region. The WSC switching line is set, for example, along a first set vehicle speed VSP1 at which engine Eng holds the idle speed when belt type continuously variable transmission CVT is the minimum transmission gear ratio.

Target power generation output calculating section 300 calculates the target power generation output by using a running power generation request output map from battery SOC. Moreover, target power generation output calculating section 300 calculates an output necessary for increasing the engine torque from the engine operating point (the engine speed, the torque) at the present time to an optimal fuel consumption line. Target power generation output calculating section 300 compares the calculated output and the target power generation output, and adds a smaller output of the calculated output and the target power generation output, to the engine output.

Operating point command section 400 calculates a transient target engine torque, the target MG torque, the target CL2 torque capacity, the target transmission gear ratio (target CVT shift), and a CL1 solenoid current command, from accelerator opening degree APO, the target steady state torque, the MG assist torque, the target running mode, vehicle speed VSP, and the required power generation output, as the operating point attainment target.

Shift control section 500 calculates a CVT solenoid current command for controlling and driving a solenoid valve within belt type continuously variable transmission CVT from the target CL2 torque capacity, and the target transmission gear ratio (the target CVT shift), so as to attain the target CL2 torque capacity, and the target transmission gear ratio.

[Engine Start Control Configuration]

Figure 4:
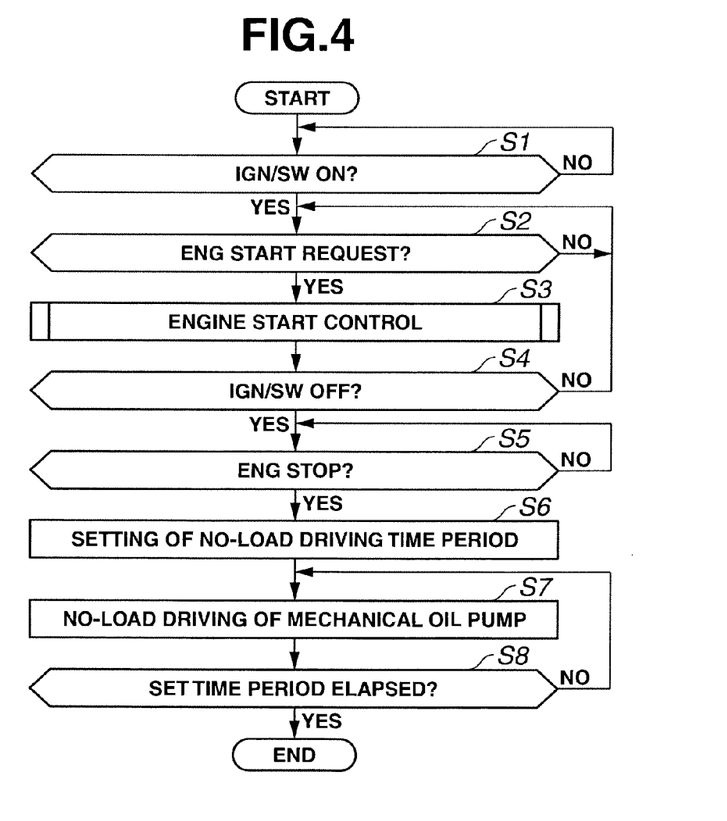
FIG. 4 is a flowchart showing a flow of an engine start control operation performed in integrated controller 10 in the first embodiment.

FIG. 4 is a flowchart showing a flow of an engine start control operation (engine start control section) performed in integrated controller 10 in the first embodiment. Hereinafter, steps of FIG. 4 indicative of the engine start control configuration are illustrated.

At step S1, integrated controller 10 judges whether or not ignition switch 23 is the ON state. When the answer of step S1 is affirmative (YES) (IGN/SW ON), the process proceeds to step S2. When the answer of step S1 is negative (NO) (IGN/SW OFF), the process repeats the judgment of step S1.

Subsequently to the judgment of IGN/SW ON at step S1 or step S4, at step S2, integrated controller 10 judges whether or not there is an engine start request. When the answer of step S2 is affirmative (YES) (there is the engine start request), the process proceeds to step S3. When the answer of step S2 is negative (NO) (there is no engine start request), the process repeats the judgment of step S2. In this case, the engine start request includes a system request outputted, for example, when the charge capacity of battery 4 becomes equal to or smaller than a predetermined capacity, and a driver request outputted, for example, when the operating (driving) point of accelerator opening degree APO and vehicle speed VSP moves across the EV→HEV switching line when the vehicle runs while the EV mode is selected.

Subsequently to the judgment that there is the engine start request at step S2, at step S3, integrated controller 10 performs the engine start control. Subsequently to step S3, the process proceeds to step S4.

In this case, the engine start control starts the engine by cranking the engine while first clutch CL1 is slip-engaged, by using motor generator MG as a starter motor. In particular, the vehicle start control includes the engine start control from the stop state of the vehicle, and the engine start control while the vehicle runs in the EV mode (EV running). These are different from each other due to the different vehicle states.

Subsequently to the engine start control at step S3, at step S4, integrated controller 10 judges whether or not ignition switch 23 is in the OFF state. When the answer of step S4 is affirmative (YES) (IGN/SW OFF), the process proceeds to step S5. When the answer of step S4 is negative (NO) (IGN/SW ON), the process returns to step S2.

Subsequently to the judgment IGN/SW OFF at step S4, or the judgment that the engine is rotated (driven) at step S5, at step S5, integrated controller 10 judges whether or not the rotation of engine Eng is stopped. When the answer of step S5 is affirmative (YES) (the engine is stopped), the process proceeds to step S6. When the answer of step S5 is negative (NO) (the engine is rotated), the process repeats the judgment of step S5.

In this case, it is judged whether or not the rotation of engine Eng is stopped, based on the sensor signal from engine speed sensor 12.

Subsequently to the judgment that the engine is stopped at step S5, at step S6, integrated controller 10 sets a no-load driving time period (=an idling time period) during which the mechanical oil pump M-O/P is driven at the no load by motor generator MG, by at least one of conditions of accumulated running distance condition, an outside air temperature condition, a previous running distance condition which is a running distance at the running at the previous time, and a battery capacity condition. Subsequently to step S6, the process proceeds to step S7.

In this case, the setting of the no-load driving time period by each of the conditions is performed as follows. In the first embodiment, a maximum time period (longest one) of the time periods set by the respective conditions is set as the no-load driving time period.

The accumulated running distance condition: the no-load driving time period is set longer as the accumulated running distance is longer.

The outside air temperature condition: the no-load driving time period is set longer as the outside air temperature from outside air temperature sensor 24 when ignition switch 23 is switched to the OFF state is lower.

The previous running distance condition: the no-load driving time period is set longer as the previous running distance from the switching of ignition switch 23 to the ON state to the switching of ignition switch 23 to the OFF state is longer.

The battery capacity condition: the no-load driving time period is set longer as the battery capacity (=the battery SOC) of battery 4 is lower.

Subsequently to the setting of the no-load driving time period at step S6, or the judgment that the setting time period does not elapse at step S8, at step S7, integrated controller 10 drives mechanical oil pump M-O/P by motor generator MG at the no load. Subsequently to step S7, the process proceeds to step S8.

Subsequently to the no-load driving of mechanical oil pump M-O/P at step S7, at step S8, integrated controller 10 judges whether or not the no-load driving time period set at step S6 elapses from the start of the no-load driving of the pump. When the answer of step S8 is affirmative (YES) (the set time period elapses), the process proceeds to the end. When the answer of step S8 is negative (NO) (the set time period does not elapse), the process returns to step S7.

Next, operations are illustrated.

The operations in the engine start control apparatus for the FF hybrid vehicle in the first embodiment is illustrated with respect to "mode transition operation of driving modes", "EV→HEV mode transition operation with engine start control", and "oil pump no-load driving operation".

[Mode Transition Operation of Driving Modes]

Figure 5:
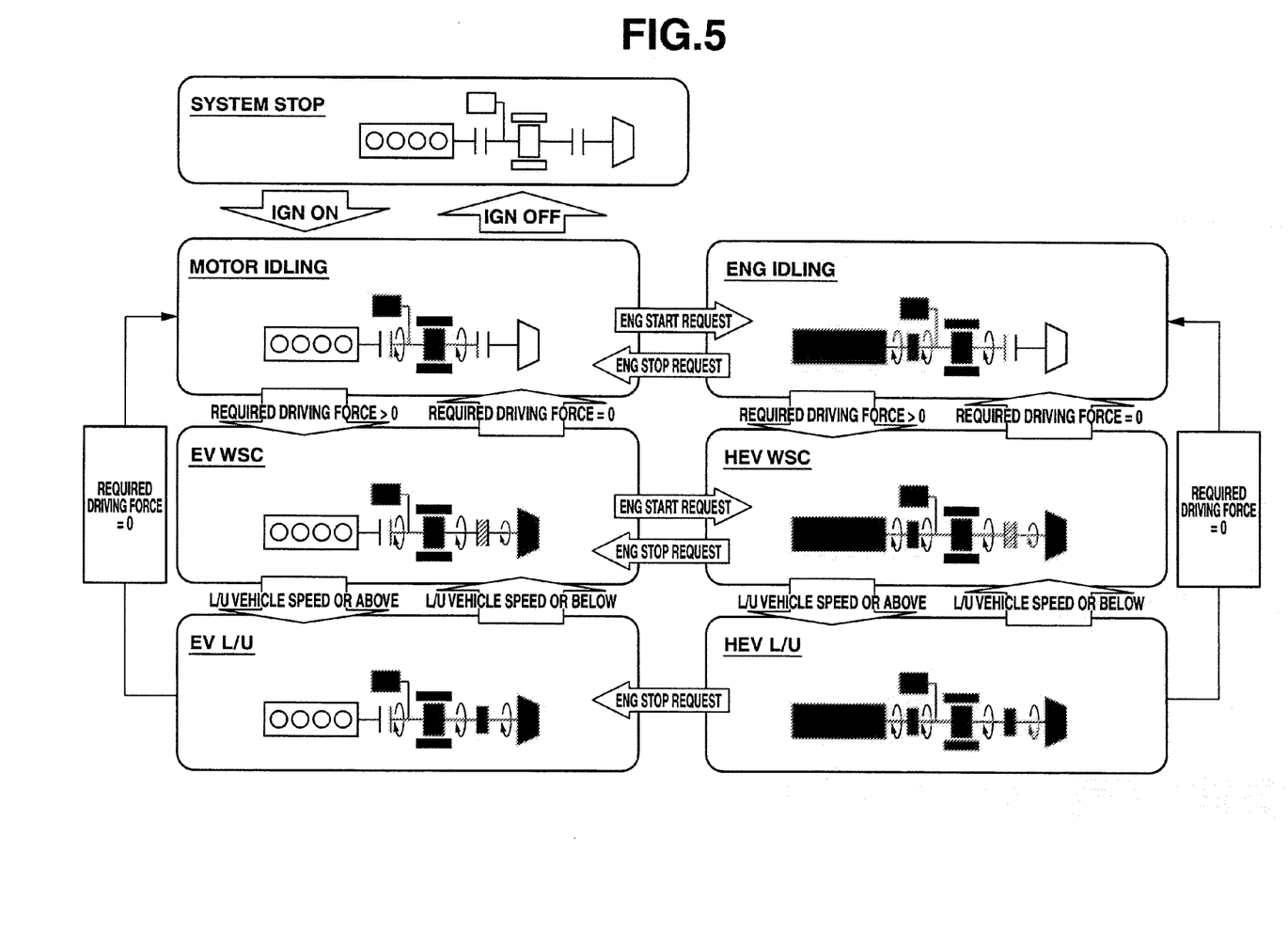
FIG. 5 is an explanatory view for illustrating a mode transition operation of driving modes of the FF hybrid vehicle to which the engine start control apparatus according to the first embodiment is applied.

FIG. 5 is a view showing a driving mode transition operation of the FF hybrid vehicle to which the engine start control apparatus according to the first embodiment is applied. Hereinafter, the mode transition operation of the driving modes is illustrated.

When ignition switch 23 is switched to the ON state, the vehicle is transited (shifted) from a system stop mode to a motor idling mode (at the stop of the vehicle, the CVT hydraulic pressure is ensured by driving the main pump by the motor). Conversely, when ignition switch 23 is switched to the OFF state in the motor idling mode, the motor idling mode is held during the predetermined time period (a no-load driving of the oil pump described later), the vehicle is transited (shifted) to the system stop state.

When the required driving force becomes greater than 0 (the required driving force>0) in the motor idling mode, the vehicle is shifted to the EV WSC mode (the power running, the regeneration by the motor while second clutch CL2 is always slipped). Conversely, when the required driving force becomes 0 (the required driving force=0) in the EV WSC mode, the vehicle is shifted to the motor idling mode.

When the vehicle speed becomes equal to or greater than a L/U vehicle speed (lockup vehicle speed) in the EV WSC mode, the vehicle is shifted to the EV L/U mode (the power generation, the regeneration by the motor while clutch CL2 is fully engaged). Conversely, when the vehicle speed becomes equal to or smaller than the L/U vehicle speed in the EV L/U mode, the vehicle is shifted to the EV WSC mode. Moreover, when the required driving force becomes equal to 0 (the required driving force=0) in the EV L/U mode, the vehicle is shifted to the motor idling mode.

When the required driving force becomes greater than zero (the required driving force>0) in an ENG idling mode (in the vehicle stop state, clutch CL1 is fully engaged after the start of engine Eng by the cranking by the motor; and the power generation is performed in the vehicle stop state), the vehicle is switched to the HEV WSC mode (the vehicle performs the power running, and the regeneration by the engine and the motor while the clutch CL2 is always slipped; and there is the additional power generation). Conversely, when the required driving force becomes equal to 0 (zero) in the HEV WSC mode, the vehicle is shifted to the ENG idling mode.

When the vehicle speed becomes equal to or greater than the L/U vehicle speed (the lockup vehicle speed) (the vehicle speed≥the L/U vehicle speed) in the HEV WSC mode, the vehicle is shifted to HEV L/U mode (the vehicle performs the power running and the regeneration by the engine Eng and the motor while the clutch CL2 is fully engaged; and there is the additional power generation). Conversely, when the vehicle speed becomes equal to or smaller than the L/U vehicle speed in the HEV L/U mode, the vehicle is shifted to the HEV WSC mode. Moreover, when the required driving force becomes equal to 0 (zero) in the HEV L/U mode, the vehicle is shifted to the ENG idling mode.

When there is the ENG start request (the ENG start is requested) in the motor idling mode, the vehicle is shifted to the ENG idling mode. Conversely, when there is the ENG stop request in the ENG idling mode, the vehicle is shifted to the motor idling mode. Moreover, when there is the ENG start request in the EV WSC mode, the vehicle is shifted to the HEV WSC mode. Conversely, when there is the ENG stop request in the HEV WSC mode, the vehicle is shifted to the EV WSC mode. Moreover, when there is the ENG stop request in the HEV L/U mode, the vehicle is shifted to the EV L/U mode.

[EV→HEV Mode Transition Operation with Engine Start Control]

Figure 6:
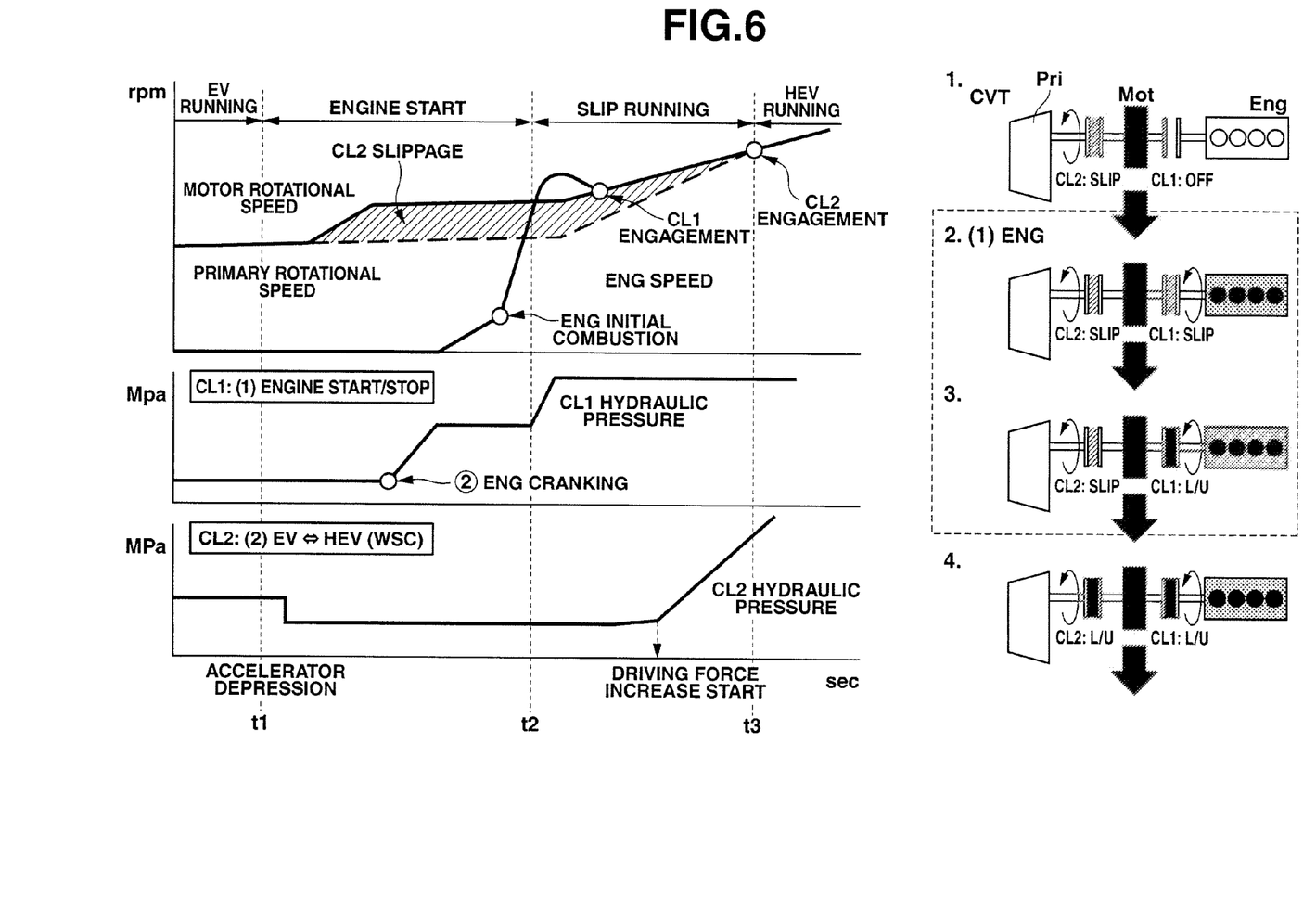
FIG. 6 is a time chart showing characteristics of a rotational speed, a first clutch hydraulic pressure, and a second clutch hydraulic pressure when the engine start control is performed based on an engine start request and the vehicle is shifted to the HEV running while the FF hybrid vehicle to which the engine start control apparatus according to the first embodiment is applied runs in the EV running mode.

FIG. 6 shows characteristics of the rotational speed, the first clutch hydraulic pressure, and the second clutch hydraulic pressure when the engine start control is performed based on the engine start request during the EV running and the vehicle is shifted to the HEV running. Hereinafter, EV→HEV mode transition operation with the engine start control is illustrated with reference to FIG. 6.

The EV running by the EV L/U mode is maintained until the time t1 at which the accelerator is depressed during the EV running. In the time period from time t1 to time t2 at which the engine start is finished, the engine start control during the EV running is performed. In the time period from time t2 to time t3 at which clutch CL2 is engaged, the slip running by the HEV WSC mode is performed. After time t3, the HEV running by the HEV L/U mode is performed. Next, the control operation of the transition from the start of the engine start control to the HEV running is illustrated.

1. Firstly, when the accelerator is depressed at time t1, the clutch CL2 hydraulic pressure is decreased at a timing immediately after time t1. The rotational speed control of the motor is performed so as to increase the rotational speed of the motor to the target rotational speed by which a predetermined slip amount is ensured. Second clutch CL2 is slip-engaged by this clutch CL2 hydraulic pressure control and this motor rotational speed control.

2. When the slip engagement of second clutch CL2 is confirmed, the clutch CL1 hydraulic pressure is started to be gradually increased. While first clutch CL1 is slip-engaged, the ENG cranking is started by using motor generator MG as the starter motor. When ENG rotational speed is increased to the initial combustion rotational speed (initial firing rotational speed), the initial ENG combustion (initial ENG firing) is performed. Then, at a timing at which engine Eng is rotated autonomously, the engine start is finished.

3. At an engine start completion time t2 at which the engine start is completed, the clutch CL1 hydraulic pressure is started to be increased toward the engagement hydraulic pressure so that the first clutch CL1 is fully engaged. At the same time, the rotational speed control of the motor rotational speed of motor generator MG is performed in accordance with the target rotational speed by which the slippage amount is decreased.

4. At a time t3 at which the motor rotational speed becomes equal to the primary rotational speed, second clutch CL2 is fully engaged. Since then, the mode is shifted to the HEV running by the HEV L/U mode in which first clutch CL1 and second clutch CL2 are fully engaged.

[Oil Pump No-load Driving Operation] First, when mechanical oil pump M-O/P (vane pump) sucks the hydraulic fluid (ATF) with the high air content percentage, the air is mixed in the hydraulic fluid, the protrusions of the vanes are deficient. Accordingly, the negative pressure becomes very small by the deficiency of the protrusion of the vanes. Consequently, it is not possible to appropriately suck the hydraulic fluid. Then, the air is gradually discharged with the time to the inner circumference side. Mechanical oil pump M-O/P sucks the hydraulic fluid by protruding the vanes. Accordingly, mechanical oil pump M-O/P discharges the air and the hydraulic fluid by protrusions of the vanes, so that the hydraulic pressure (the discharge pressure) is started to be discharged. At the start of the engine at the ordinary temperature, the air is rapidly discharged to the inner circumference side, so that the problems are not arisen. However, at the engine start at the extreme low temperature, the state in which the hydraulic pressure (the discharge pressure) is hard to be generated is continued during the long time period.

As described above, in particular, the start of the increase (initial increase) of the discharge pressure from mechanical oil pump M-O/P is delayed at the engine start at the extreme low temperature, due to the mixture of the air to the hydraulic fluid (ATF). Accordingly, it is necessary to provide the countermeasures to ensure the response of the start of the increase of the pump discharge pressure at the start of the engine at the extreme low temperature. Hereinafter, the oil pump no-load driving operation to provide the above-described countermeasures is illustrated.

First, the engine start control operation is illustrated with reference to the flowchart of FIG. 4. When ignition switch 23 is in the ON state and there is the engine start request, the process proceeds along the flow of step S1→step S2→step S3→step S4 in the flowchart of FIG. 4. The flow of step S2→step S3→step S4 is repeated as long as ignition switch 23 is in the ON state. At step S3, the engine start control is performed in accordance with the engine start request.

Then, when the vehicle is stopped and ignition switch 23 is switched to the OFF state, the process proceeds from step S4 to step S5 in the flowchart of FIG. 4. At step S5, it is judged whether or not engine Eng is stopped. When engine Eng is stopped, the process proceeds from step S5 along the flow of step S6→step S7→step S8. At step S6, the no-load driving time period is set. At step S7, the no-load driving of mechanical oil pump M-O/P is continued until the set time period is elapsed.

That is, immediately after the switching of ignition switch 23 to the OFF state, the temperature of the hydraulic fluid is high and the viscosity of the hydraulic fluid is low. Accordingly, the performance to discharge the air bubbles remained (accumulated) around oil filter 8 of strainer 6 by the pump driving is increased. In addition, there is no rotation stirring by the power train since the engine Eng is stopped. Accordingly, the air bubbles included in the hydraulic fluid is not increased. Consequently, after engine Eng is stopped when ignition switch 23 is in the OFF state, the air content percentage of the air bubbles included in the hydraulic fluid is decreased merely by the no-load driving of mechanical oil pump M-O/P during the predetermined time period.

Figure 7:
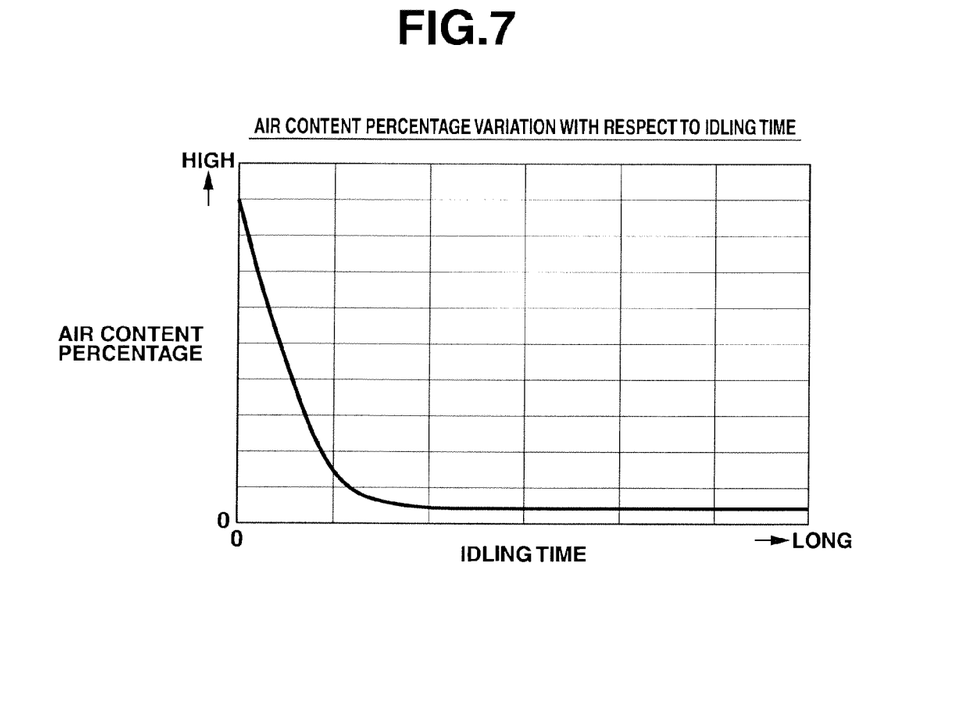
FIG. 7 is a characteristic view showing a variation of an air content percentage with respect to an idling time period in the FF hybrid vehicle to which the engine start control apparatus according to the first embodiment is applied.

The present inventor confirms the following matter by experiment. In a case where the no-load driving time period (idling time period) of mechanical oil pump M-O/P is added after the end of the running of the vehicle, the air content percentage of the air bubbles included in the hydraulic fluid is decreased by the steep downward inclination (gradient) in the initial region of the idling time period, by providing the predetermined time period of the idling time period, as shown in FIG. 7.

In this way, after ignition switch 23 is switched to the OFF state, the pump no-load driving operation to previously decrease the air content percentage of the air bubbles included in the hydraulic fluid is performed. With this, when the next engine start is performed after ignition switch 23 is switched to the ON state, the start of the increase of the discharge pressure from mechanical oil pump M-O/P is improved even at the extreme low temperature since the air content percentage is sufficiently decreased. Consequently, the engine Eng can be started with the high response.

Next, the setting of the no-load driving time period (=the idling time period) of the no-load driving of mechanical oil pump M-O/P by motor generator MG is illustrated.

In the first embodiment, the pump no-load driving time period is set to longest one of the time period set by the accumulated running distance condition, the time period set by the outside air temperature condition, the time period set by the previous running distance condition, and the time period set by the battery capacity.

Accordingly, the air content percentage of the air bubbles included in the hydraulic fluid is decreased to the target content percentage by the appropriate pump no-load driving time period according to the various conditions from the reason of the generation of the air bubbles included in the hydraulic fluid, to the disappearance of the air bubbles included in the hydraulic fluid. Consequently, the response of the start of the increase of the hydraulic fluid is ensured.

In the first embodiment, the pump no-load driving time period is set longer as the accumulated running distance is longer.

Figure 8:
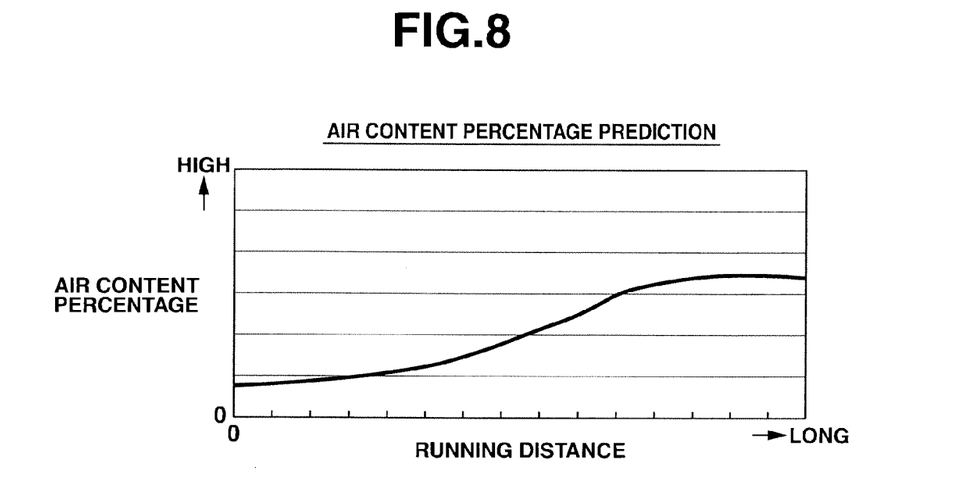
FIG. 8 is an air content percentage prediction characteristic view showing a variation of the air content percentage with respect to a running distance of the FF hybrid vehicle to which the engine start control apparatus according to the first embodiment is applied.

That is, an antifoam agent to defoam (disappear) the air bubbles is mixed in the hydraulic fluid. The antifoam effect is diminished in accordance with the oil deterioration by the accumulated running distance. Accordingly, as shown in FIG. 8, the air content percentage of the air bubbles included in the hydraulic fluid becomes higher as the accumulated running distance becomes longer.

On the other hand, when the pump no-load driving time period is set longer as the accumulated running distance becomes longer, the air content percentage of the air bubbles included in the hydraulic fluid is decreased to the target content percentage in consideration with the relationship between the accumulated running distance and the air content percentage, irrespective of the accumulated running distance (the long distance or the short distance).

In the first embodiment, the pump no-load driving time period is set longer as the outside air temperature from air temperature sensor 24 when ignition switch 23 is switched to the OFF state is lower. That is, when the outside air temperature is low, the oil temperature becomes low, so that the frictional load of the mechanical oil pump M-O/P becomes higher. Moreover, the air bubbles are hard to disappear. Consequently, the time of the start of the increase of the hydraulic pressure of mechanical oil pump M-O/P is delayed. The start of the increase (the initial rise) of the hydraulic pressure of mechanical oil pump M-O/P needs the long time period.

On the other hand, when the pump no-load driving time period is set longer as the outside air temperature becomes lower, the air content percentage of the air bubbles included in the hydraulic fluid is decreased to the target content percentage in consideration of the relationship between the oil temperature and the time of the start of the increase of the hydraulic pressure, irrespective of the temperature (the high temperature or the low temperature) of the oil.

In this first embodiment, the pump no-load driving time period is set longer as the previous running distance from the timing at which ignition switch 23 is switched to the ON state, to the timing at which ignition switch 23 is switched to the OFF state is longer. That is, when the previous running distance is longer, the air content percentage of the air bubbles included in the hydraulic fluid becomes higher by the stirring of the hydraulic fluid by the rotary members of the power train (the drums, the gears, the pulleys, the belts, and so on).

On the other hand, when the pump no-load driving time period is set longer as the previous running distance becomes longer, the air content percentage of the air bubbles included in the hydraulic fluid is decreased to the target content percentage in consideration of the relationship between the previous running distance and the air content percentage, irrespective of the previous running distance (the long distance or the short distance).

In the first embodiment, the pump no-load driving time period is set longer as the battery capacity of battery 4 (battery SOC) is lower.

That is, when the battery capacity is low, the rotational speed of motor generator MG which performs the no-load driving of mechanical oil pump M-O/P is decreased. Moreover, the time of the start of the increase of the hydraulic fluid of mechanical oil pump M-O/P becomes later (is delayed) as the rotational speed of the motor is decreased.

On the other hand, when the pump no-load driving time period is set longer as the battery capacity is lowered, the air content percentage of the air bubbles included in the hydraulic fluid is decreased to the target content percentage in consideration of the relationship between the battery capacity and the time of the start of the increase of the hydraulic pressure, irrespective of the capacity (the high capacity or the low capacity) of battery 4.

Next, effects are illustrated.

In the engine start control apparatus for the FF hybrid vehicle according to the first embodiment, below-described effects are attained.

(1) The drivetrain includes engine Eng, the motor (motor generator MG), the normally-open hydraulic clutch (first clutch CL1) disposed between the engine Eng and motor (motor generator MG).

The hydraulic clutch (first clutch CL1) is engaged by a clutch hydraulic pressure generated based on a discharge pressure from an oil pump (mechanical oil pump M-O/P) driven by the motor (motor generator MG).

Moreover, the engine start control apparatus for the FF hybrid vehicle includes an engine start control section configured to crank the engine by using the motor (motor generator MG) as the starter motor while the hydraulic clutch (first clutch CL1) is slip-engaged when the discharge pressure from the oil pump (mechanical oil pump M-O/P) is ensured by driving the motor (motor generator MG), when the engine Eng is started after ignition switch 23 is switched to the ON state.

This engine start control section (FIG. 4) is configured to drive the oil pump (mechanical oil pump M-O/P) at the no-load by the motor (motor generator MG) during a predetermined time period after engine Eng is stopped when ignition switch 23 is in the OFF state (step S4—step S8).

Accordingly, it is possible to ensure the response of the engine start at the engine start in the low temperature state, even by the small battery.

(2) Engine start control section (FIG. 4) is configured to set the predetermined time period for the driving the oil pump (mechanical oil pump M-O/P) at the no load, to a longest time period (longest one) of a time period set based on an accumulated running distance condition, a time period set based on an outside air temperature condition, a time period set based on a previous running distance condition, and a time period set based on a battery capacity condition (step S6).

Accordingly, it is possible to set the appropriate pump no-load driving time period for decreasing the air content percentage to the target content percentage, and to ensure the response of the start of the increase of the hydraulic pressure, irrespective of the various conditions relating to the air bubbles.

(3) Engine start control section (FIG. 4) is configured to set the predetermined time period for driving the oil pump (mechanical oil pump M-O/P) at the no load to a longer time period as the accumulated running distance is longer (step S6).

Accordingly, it is possible to decrease the air content percentage of the air bubbles included in the hydraulic fluid to the target content percentage in accordance with the relationship between the accumulated running distance and the air content percentage, irrespective of the long distance or the short distance of the accumulated running distance.

(4) The engine start control section (FIG. 4) is configured to set the predetermined time period for driving the oil pump (mechanical oil pump M-O/P) at the no load to a longer time period as the outside air temperature when ignition switch 23 is switched to the OFF state is lower (step S6).

Accordingly, it is possible to decrease the air content percentage of the air bubbles included in the hydraulic fluid to the target content percentage in accordance with the relationship between the oil temperature and the time of the start of the increase of the hydraulic pressure, irrespective of the high temperature or the low temperature of the oil temperature.

(5) The engine start control section (FIG. 4) is configured to set the predetermined time period for driving the oil pump (mechanical oil pump M-O/P) at the no load to the longer time period as the previous running distance from the timing at which ignition switch 23 is switched to the ON state to the timing at which ignition switch 23 is switched to the OFF state is longer (step S6).

Accordingly, it is possible to decrease the air content percentage of the air bubbles included in the hydraulic fluid to the target content percentage in accordance with the relationship between the previous running distance and the air content percentage, irrespective of the long distance or the short distance of the previous running distance.

(6) Engine start control section (FIG. 4) is configured to set the predetermined time period for driving the oil pump (mechanical oil pump M-O/P) at the no load to the longer time period as the battery capacity is lower (step S6).

Accordingly, it is possible to decrease the air content percentage of the air bubbles included in the hydraulic fluid to the target content percentage in accordance with the relationship between the battery capacity and the time of the start of the increase of the hydraulic pressure, irrespective of the high capacity or the low capacity of battery 4.

In the first embodiment, the engine start control section is configured to set the predetermined time period for driving mechanical oil pump M-O/P at the no load, to longest time period (longest one) of a time period set based on the accumulated running distance condition, a time period set based on the outside air temperature condition, a time period set based on the previous running distance condition, and a time period set based on the battery capacity condition. However, the engine start control section may set the pump no-load driving time period to a time period set based on at least one of the accumulated running distance condition, the outside air temperature condition, the previous running distance condition, and the battery capacity condition. For example, the pump no-load driving time period may be set only by the outside air temperature condition. Moreover, the pump no-load driving time period may be set by another condition or two other conditions, in addition to the outside air temperature condition. Furthermore, the pump no-load driving time period may be set by setting a condition which can sense (figure out) the air content percentage, in addition to the above-described four conditions.

In the first embodiment, the present invention is applied to the hybrid vehicle including the transmission, one motor, and two clutch. However, for example, the present invention is applicable to a hybrid vehicle having a drivetrain which does not have the second clutch CL2, the belt type continuously variable transmission, and a stepwise automatic transmission. That is, the present invention is applicable to any hybrid vehicle as long as the vehicle is a hybrid vehicle having a drivetrain in which the normally-open hydraulic clutch is disposed between the engine and the motor, and which uses the motor as the starter motor at the start of the engine. The present invention is applicable to a hybrid vehicle which has a type different from the type of the first embodiment. For example, the present invention is applicable to a hybrid vehicle which includes a power dividing apparatus by a differential gear mechanism in the drivetrain.

In the embodiment of the present invention, an engine start control apparatus for a hybrid vehicle including a drivetrain including an engine, a motor, a normally-open hydraulic clutch disposed between the engine and the motor, and arranged to be engaged by a clutch hydraulic pressure generated based on a discharge pressure from an oil pump driven by the motor, the engine start control apparatus includes: an engine start control section configured to crank the engine by using the motor as a starter motor while the hydraulic clutch is slip-engaged when the discharge pressure from the oil pump is ensured by driving the motor, when the engine is started after an ignition switch is switched to an ON state, the engine start control section being configured to drive the oil pump by the motor at a no load during a predetermined time period after the engine is stopped when the ignition switch is in an OFF state.

Accordingly, the control of the no-load driving of the oil pump is performed during the predetermined time period after the engine is stopped when the ignition switch is in the OFF state.

That is, the oil pump has a high performance (ability) to discharge the air bubbles remained (stagnated) around the oil filter of the strainer by the pump driving immediately after the switch of the ignition switch to the OFF state, since the temperature of the hydraulic fluid is high and the viscosity of the hydraulic fluid is low immediately after the switch of the ignition switch to the OFF state. Moreover, there is no stirring by the power train components since the engine is stopped. Accordingly, the air bubbles included in the hydraulic fluid is not increased. Consequently, the air content percentage of the air bubbles included in the hydraulic fluid is decreased merely by the no-load driving of the oil pump during the predetermined time period after the engine is stopped.

In this way, the pump no-load driving to previously decrease the air content percentage of the air bubbles included in the hydraulic fluid is performed after the OFF operation of the ignition switch. With this, it is possible to improve the start of the increase of the discharge pressure from the oil pump even in the low temperature state at the next engine start after the ignition switch is switched to the ON state, and to perform the engine start with the high response.

For example, when the control operation is performed so that the oil pump is driven by the motor during the predetermined time period after the ignition switch is switched to the ON state, the engine start is delayed. Moreover, when the oil pump is driven by the high motor torque for improving the start of the increase of the discharge pressure of the pump in the low temperature state after the ignition switch is switched to the ON state, the amount of the charge consumed from the battery is increased. Therefore, it is necessary to provide the large battery with high charge capacity.

Consequently, in this embodiment, it is possible to ensure the response of the engine start even by the small battery at the engine start in the low temperature state.

The entire contents of Japanese Patent Application No. 2012-011650 filed Jan. 24, 2012 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An engine start control apparatus for a hybrid vehicle including a drivetrain including an engine, a motor, a normally-open hydraulic clutch disposed between the engine and the motor, and arranged to be engaged by a clutch hydraulic pressure generated based on a discharge pressure from an oil pump driven by the motor, the engine start control apparatus comprising:
    an engine start control section configured to crank the engine by using the motor as a starter motor while the hydraulic clutch is slip-engaged when the discharge pressure from the oil pump is ensured by driving the motor, when the engine is started after an ignition switch is switched to an ON state,
    the engine start control section being configured to drive the oil pump by the motor at a no-load during a predetermined time period after the engine is stopped immediately after the ignition switch is switched to an OFF state.

2. The engine start control apparatus as claimed in claim 1, wherein the engine start control section is configured to set the predetermined time period for the no-load driving of the oil pump, based on at least one of an accumulated running distance condition, an outside air temperature condition, a previous running distance condition, and a battery capacity condition.

3. The engine start control apparatus as claimed in claim 2, wherein the engine start control section is configured to set the predetermined time period for the no-load driving of the oil pump to a longer time period as an accumulated running distance is longer.

4. The engine start control apparatus as claimed in claim 2, wherein the engine start control section is configured to set the predetermined time period for the no-load driving of the oil pump to a longer time period as an outside temperature when the ignition switch is switched to the OFF state is lower.

5. The engine start control apparatus as claimed in claim 2, wherein the engine start control section is configured to set the predetermined time period for the no-load driving of the oil pump to a longer time period as a previous running distance from when the ignition switch is switched to the ON state to when the ignition switch is switched to the OFF state is longer.

6. The engine start control apparatus as claimed in claim 2, wherein the engine start control section is configured to set the predetermined time period for the no-load driving of the oil pump to a longer time period as a battery capacity is lower.

* * * * *